United States Patent [19]

Onishi et al.

[11] Patent Number: 5,155,161

[45] Date of Patent: Oct. 13, 1992

[54] STYRENE RESIN COMPOSITION

[75] Inventors: Hidenori Onishi; Kohokichi Noguchi; Hiroyuki Watanabe, all of Kawasaki, Japan

[73] Assignee: Nippon Zeon Co., Ltd., Tokyo, Japan

[21] Appl. No.: 578,228

[22] Filed: Sep. 6, 1990

[30] Foreign Application Priority Data

Sep. 6, 1989 [JP] Japan ................................. 1-231296

[51] Int. Cl.$^5$ ............................................... C08K 5/01
[52] U.S. Cl. .................................... 524/515; 524/217; 524/241
[58] Field of Search ................. 524/515; 525/217, 241

[56] References Cited

U.S. PATENT DOCUMENTS 4,647,625 3/1987 Aonuma et al. .................... 525/241

*Primary Examiner*—John C. Bleutge
*Assistant Examiner*—Mark Sweet
*Attorney, Agent, or Firm*—Sherman and Shalloway

[57] ABSTRACT

A styrene resin composition comprising [I] a polymer component which is a mixture of (A) 1 to 50% by weight of a resinous styrene polymer in which a functional group represented by formula $$>C=N^+<$$

is bound to a polymer chain either directly or via the other atomic group and (B) 99 to 50% by weight of the other styrene resin than the above, and [II] a particulate or granular additive [II].

3 Claims, No Drawings

STYRENE RESIN COMPOSITION

This invention relates to a styrene resin composition characterized in that since the composition is excellent in dispersibility of additives such as a pigment, a fire retardant, an inorganic filler, etc., the properties are less decreased even if the additives are added.

Styrene resins have been employed in various usages because of the excellent physical properties such as a moldability, etc. and the low cost. Moreover, so-called rubber-modified polystyrene resins with an impact strength imparted by reinforcement with a rubber such as polybutadiene have found wide application in the field of electrical appliances.

In general, the styrene resins are used with the addition of particulate or granular additives such as a pigment, a fire retardant, an inorganic filler, etc. However, even if selecting additives that relatively less influence properties, decrease in properties of the resins occurs at times due to a poor dispersibility thereof. Particularly, a rubber-modified polystyrene notably decreases the dispersibility thereof.

For improving a dispersibility of additives, a method of mixing resins with additives (e.g. a method in which a particulate mixture resulting from premixing via a supermixer is melt-mixed by an extruder), types or combination of the additives, and so forth have been studied; however, a method sufficient to prevent decrease in properties has not been established. Japanese Laid-open Patent Application No. 8411/1988 discloses a method in which a conjugated diene rubber obtained by the reaction with a specific compound is added as a toughening agent to a high-impact polystyrene. This method improves decrease in properties to some extent but is still insufficient.

It is an object of this invention to provide a styrene resin composition that less decreases properties by improving a dispersibility of particulate or granular additives such as a pigment, a fire retardant, an inorganic filler, etc. when the additives are added to a styrene resin.

The present inventors have found that the styrene resin and the particulate or granular additives are mixed in the presence of polystyrene or a resinous styrene copolymer to which a specific functional group is bound to suppress decrease in properties of the styrene resin.

This invention thus provides a styrene resin composition comprising I] *a polymer component which is a mixture of (A)* 1 to 50% by weight of a resinous styrene polymer in which a functional group represented by formula

>C=N< is bound to a polymer chain either directly or via the other atomic group and (B) 99 to 50% by weight of the other styrene resin than the above, and II a particulate or granular additive.

In this invention, the resinous styrene polymer (A) to which the functional group is bound is produced by a method in which an anionic living polymer formed in the presence of an alkali metal substrate catalyst and/or an alkaline earth metal substrate catalyst or a polymer obtained by adding these metals via a post-reaction is reacted with an organic compound to be described later and hydrolysis is then conducted (refer to U.S. Pat. Nos. 4,550,142 and 4,647,625).

The resinous styrene polymer (A) is formed by reacting a living polymer obtained from a styrene monomer alone or by anionically polymerizing said monomer with a monomer copolymerizable therewith with an organic compound to be described later, and then conducting hydrolysis. Examples of the styrene monomer are styrene, alpha-methylstyrene and vinyltoluene. Such styrene polymer (A) has to be composed of 90 to 100% by weight of a styrene monomer because the functional group of the polymer (A) must uniformly be dispersed in the matrix of the styrene resin (B) being blended therewith. When the amount is less than 90% by weight, dispersion of the functional group into the matrix becomes insufficient, making it hard to suppress decrease in properties of the styrene resin composition. Though the sequence distribution of the styrene monomer in the copolymer is not limited in particular, it is advisable to distribute the styrene monomer as randomly as possible.

Though the monomer copolymerizable with the styrene monomer is not limited in particular, conjugated diene monomers such as butadiene, isoprene, piperylene and phenyl butadiene are most preferable.

Typical examples of the alkali metal catalyst are organic lithium compounds having 2 to 20 carbon atoms such as n-butyl lithium and sec-butyl lithium.

Examples of the alkaline earth metal substrate catalyst are a catalyst series composed mainly of compounds of barium, strontium and calcium disclosed in U.S. Pat. Nos. 3,946,385, 3,992,561, 4,079,176, 4,092,268, 4,112,210, 4,129,705 and 4,297,240. They are however not critical.

The organic compound used in this reaction is preferably a compound selected from a compound having in a molecule a functional group represented by formula

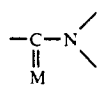

wherein M denotes an oxygen or sulfur atom, an N-substituted aminoketone, an N-substituted aminothioketone, an N-substituted aminoaldehyde and an N-substituted aminothioaldehyde.

Examples of the organic compound include N-substituted lactams and their corresponding thiolactams such as N-methyl-beta-propiolactam, N-t-butyl-beta-propiolactam, N-methoxyphenyl-beta-propiolactam, N-phenyl-betapropiolactam, N-naphthyl-beta-propiolactam, N-methyl2-pyrrolidone, N-t-butyl-2-pyrrolidone, N-phenyl-2pyrrolidone, N-methoxyphenyl-2-pyrrolidone, N-vinyl2-pyrrolidone, N-benzyl-2-pyrrolidone, N-naphthyl-2pyrrolidone, N-methyl-5-methyl-2-pyrrolidone, N-tbutyl-5-methyl-2-pyrrolidone, N-phenyl-5-methyl-2pyrrolidone, N-methyl-3,3-dimethyl-2-pyrrolidone, N-t-butyl-3,3-dimethyl-2-pyrrolidone, N-phenyl-3,3dimethyl- 2-pyrrolidone, N-methyl-2-piperidone, N-t-butyl-2-piperidone, N-phenyl-2-pyperidone, N-methoxyphenyl-2-piperidone, N-vinyl-2-piperidone, N-benzyl-2-piperidone, N-naphthyl-2-piperidone, N-methyl-3,3-dimethyl-2-piperidone, N-t-butyl-3,3-dimethyl-2-piperidone, N-methyl-epsilon-caprolactam, N-phenyl-epsilon-caprolactam, N-methoxyphenyl-epsilon-caprolactam, N-vinyl-epsilon-caprolactam, N-benzyl-epsilon-caprolactam, N-naphthyl-epsilon-caprolactam, N-methyl-omega-laurylolactam, N-phenyl-omega-laurylolactam, N-t-butyl-omega-laurylolactam, N-vinyl-omega-laurylolactam, and N-benzyl-omega-laurylolactam; N-substituted cyclic ureas and corresponding N-substituted cyclic thioureas such as 1,3-dimethylethyleneurea, 1,3-diphenylethyleneurea, 1,3-di-t-butylethyleneurea, and 1,3-divinylethyleneurea; N-substituted aminoketones and corresponding N-substituted aminothioketones such as 4-dimethylaminobenzophenone, 4-diethylaminobenzophenone, 4-di-t-butylaminobenzophenone, 4-diphenylaminobenzophenone, 4,4-bis(dimethylamino)benzophenone, 4,4-bis(diethyl-amino)benzophenone, 4,4-bis(di-t-butylamino)-benzophenone, 4,4-bis(diphenylamino)benzophenone, 4,4-bis(divinylamino)benzophenone, 4-dimethylaminoacetophenone, 1,3-bis(diphenylamino)-2-propane, and 1,7-bis(methylethylamino)-4-heptane; and N-substituted aminoaldehydes and corresponding N-substituted aminothioaldehydes such as 3-dimethylaminopropionaldehyde, 3-diethylaminopropionaldehyde, 4-dimethylaminobenzaldehyde, 3-dicyclohexylaminopropionaldehyde, 3,5-bis(dicyclohexylamino)benzaldehyde, 4-diphenylaminobenzaldehyde, and 4-divinylaminobenzaldehyde.

It is advisable that the amount of the organic compound is 0.05 to 10 mols per mol of the alkali metal substrate catalyst and/or the alkaline earth metal substrate catalyst used in adding the above metal to the polymer by anionic polymerization and post-reaction. When it is less than 0.05 mol, improvement in dispersion stability is insufficient. When it exceeds 10 mols, an adverse effect is exerted on properties of the resin composition by the side reaction. More preferable is 0.2 to 3 mols.

The reaction is run in a solution. Hydrolysis and recovery of a reaction product are carried out at the same time by a method in which after the reaction, an alcohol is added to a reaction system or a method in which a reaction mixture is subjected to steam stripping.

The resinous styrene polymer (A) can also be produced by reacting a copolymer of a styrene monomer and a conjugated diene monomer containing more than 90% by weight of units derived from the styrene monomer regardless of a polymerization method, with the aforesaid anionic polymerization catalyst in a usual manner, to add the alkali metal and/or the alkaline earth metal.

In this invention, examples of the other styrene resin (B) than the resinous styrene polymer (A) having the functional group (hereinafter referred to at times as a "modified styrene polymer"), which is mechanically mixed with the polymer A, are resins produced in a usual manner, such as a polystyrene resin, a highimpact polystyrene resin (HIPS), a styrene-butadiene copolymer resin, an AS resin and an ABS resin.

The composition of this invention must contain as a polymer component a mixture of 1 to 50% by weight of a modified styrene polymer (A) and 99 to 50% by weight of the other styrene resin than the above. When the proportion of the polymer (A) is less than 1% by weight, the particulate or granular additive to be described later cannot uniformly be dispersed. When it is more than 50% by weight, an effect of a dispersibility of an additive is unchanged. It is preferably 2 to 10% by weight.

Examples of the particulate or granular additive [II] added to the polymer component [I] include a pigment such as titanium oxide, zinc oxide, barium sulfate, calcium carbonate, carbon black, chrome yellow, or cadmium yellow; an inorganic filler or a reinforcing agent such as carbon black, calcium carbonate, glass fiber, silica, or clay; and a fire retardant such as antimony oxide or aluminum hydroxide. The types and amounts of the additives are not particularly limited in this invention, and the optimum types and amounts are determined depending on the use purpose and the required performance of the composition in this invention.

The composition of this invention may contain, in addition to the aforesaid additives, a liquid fire retardant such as tricresyl phosphate, trischloroethyl phosphate, tris(dichloropropyl) phosphate, triphenyl phosphate, tris(dibromopropyl) phosphate, chlorophosphate, bromophosphate, tetrabromoethane, and chlorinated polyphenyl.

Since the styrene resin composition of this invention has an excellent dispersibility of particulate or granular additives such as a pigment, a fire retardant, an inorganic filler, etc. compared to the conventional sylene resins, the properties are less decreased even if the additives are added, and the composition is thus quite useful.

The following Examples and Comparative Examples illustrate this invention more specifically.

EXAMPLE 1

A 20-liter stainless steel reaction vessel was charged with 7200 g of cyclohexane and 1800 g of styrene in an atmosphere of nitrogen, and 93 mmols of tetrahydrofuran and 22.1 mmols of n-butyl lithium as a polymerization initiator were added thereto. The polymerization was run at 50° C. for 2 hours.

Subsequently, to the resulting anionic living polystyrene was added 18.4 mmols of N-methylpyrrolidone. After stirring the mixture for 15 minutes, 20 mmols of methanol was added to terminate the reaction.

This solution was added dropwise to a 2.0% methanol solution of 4-methyl-di-t-butylphenol. The resulting polymer was solidified and then dried at 60° C. under reduced pressure to obtain a modified polystyrene (a). A weight average molecular weight of the modified polystyrene (calculated as standard polystyrene) measured by GPC is shown in Table 1.

Twenty parts by weight of the modified polystyrene (a) and commercial HIPS (TOPOREX 830, a tradename for a product of Mitsui Toatsu Chemicals, Inc.) were kneaded and pelletized by an extruder. The pellet was compression-molded into a plate which was then subjected to machining. There was obtained a test piece for evaluation of properties.

One hundred parts by weight of the composition was then blended with 16.6 parts by weight of DECHLORANE (a tradename for perchloropentacyclodecane of Hooker Chem.) and 8.4 parts by weight of antimony oxide to obtain a fire-retardant polystyrene composition. The test piece of the composition was prepared as above. Using these test pieces, a tensile modulus was measured according to JIS K-7113 and an Izod impact strength according to JIS K-7110 respectively. The results are shown in Table 2.

EXAMPLE 2

A modified polystyrene (b) was obtained in the same way as in Example 1 except using 4,4'-bis(diethylamino)benzophenone as a compound being reacted with the anionic living polymer. The properties were evaluated as in Example 1. A molecular weight of the modified polystyrene is shown in Table 1 and the properties in Table 2 respectively.

COMPARATIVE EXAMPLE 1

Polystyrene (c) was obtained as in Example 1 except that after preparation of the anionic living polymer, the reaction was terminated with methanol without the post-reaction. The properties were evaluated as in Example 1. The results are shown in Tables 1 and 2.

EXAMPLE 3

A 20-liter stainless steel polymerization vessel was charged with 7200 g of cyclohexane and 1800 g of styrene in an atmosphere of nitrogen, and 93 mmols of tetrahydrofuran and 65.1 mmols of n-butyl lithium as a polymerization initiator were added thereto. The polymerization was performed at 50° C. for 2 hours. After the polymerization, 60.0 mmols of N-methylpyrrolidone was added and stirring was conducted for 15 minutes. Subsequently, 60 mmols of methanol was added to terminate the reaction. This solution was added dropwise to a 2.0 % methanol solution of 4-methyl-di-t-butylphenol. The resulting polymer was solidified and then dried at 60° C. under reduced pressure to obtain a modified polystyrene (d).

Twenty parts by weight of the polymer and 100 parts by weight of commercial HIPS (TOPOREX, a tradename for a product of Mitsui Toatsu Chemicals, Inc.) were kneaded and pelletized by an extruder. The pellet was compression-molded into a plate which was then subjected to machining. There was obtained a test piece for evaluation of properties.

In the same way as in Example 1, a fire-retardant polystyrene composition was formed and evaluated.

The results are shown in Tables 1 and 2.

COMPARATIVE EXAMPLE 2

A polystyrene (e) was obtained as in Example 3 except that after the formation of an anionic living polymer, the reaction was terminated with methanol without the post-reaction, and evaluation was carried out as in Example 3. The results are shown in Tables 1 and 2.

COMPARATIVE EXAMPLE 3

A 20-liter stainless steel polymerization vessel was charged with 7200 g of cyclohexane and 360 g of styrene in an atmosphere of nitrogen, and 22.1 mmols of n-butyl lithium as a polymerization initiator was added. The polymerization was performed at 50° C. for 2 hours. Subsequently, 1080 g of butadiene was added at a rate of 20 g/min. After the polymerization for 20 minutes, 360 g of styrene was further added at a rate of 20 g/min.

To the resulting anionic living S-B-S block copolymer (wherein S is polystyrene and B is polybutadiene) was then added 18.4 mmols of N-methylpyrrolidone, and stirring was conducted for 15 hours. The reaction was terminated with the addition of 20 mmols of methanol.

This solution was added dropwise to a 2.0% methanol solution of 4-methyl-di-t-butylphenol. The resulting polymer was solidified and then dried at 60° C. under reduced pressure to obtain a modified S-B-S block copolymer (f).

Twenty parts by weight of the block copolymer and 100 parts by weight of commercial polystyrene (TOPOREX GP525, a tradename for a product of Mitsui Toatsu Chemicals, Inc.) were kneaded and pelletized by an extruder. Evaluation was conducted as in Example 1. A fire-retardant polystyrene composition was formed and evaluated as in Example 1. The results are shown in Table 2.

TABLE 1

|  | Molecular weight | Modifying agent |
|---|---|---|
| Modified polystyrene | $9.8 \times 10^4$ | N-methylpyrrolidone |
| Modified polystyrene | $10.2 \times 10^4$ | 4,4'-bisdiethylaminobenyophenone |
| Polystyrene | $9.8 \times 10^4$ | — |
| Modified polystyrene | $3.2 \times 10^4$ | N-methylpyrrolidone |
| Polystyrene | $3.2 \times 10^4$ | — |
| Modified block copolymer | $11.2 \times 10^4$ | N-methylpyrrolidone |

TABLE 2

|  | Example 1 | Example 2 | Comparative Example 1 | Example 3 | Comparative Example 2 | Comparative Example 3 |
|---|---|---|---|---|---|---|
| Modified styrene polymer | a | b | c | d | e | f |
| not using a fire retardant |  |  |  |  |  |  |
| IZOD (kg · cm/cm) | 7.8 | 7.9 | 8.0 | 8.1 | 8.0 | 4.4 |
| Tensile Modulus (kg/cm$^2$) | 14080 | 14160 | 14000 | 14060 | 14380 | 19660 |
| Burning state | burnt | burnt | burnt | burnt | burnt | burnt |
| using a fire retardant |  |  |  |  |  |  |
| IZOD (kg · cm/cm) | 7.4 | 7.3 | 5.9 | 7.3 | 5.9 | 3.2 |
| Tensile Modulus (kg/cm$^2$) | 13410 | 13600 | 13100 | 13700 | 13200 | 18670 |
| Burning state | self-extinguished | self-extinguished | self-extinguished | self-extinguished | self-extinguished | self-extinguished |

The foregoing results reveal that the styrene resin compositions having the functional group in this invention are very low in decrease in properties when various additives such as a pigment, an inorganic filler, a fire retardant, etc. are added.

What we claim is:

1. A styrene resin composition comprising a polymer component which is a mixture of:
   A) 1 to 50% by weight of a resinous styrene polymer, said resinous styrene polymer comprising at least 90% by weight of a styrene monomer, said polymer having a functional group represented by formula (I)

$$>C=N< \quad \text{(I)}$$

bound to a polymer chain directly or via an atomic group;

B) 99 to 50% by weight of a styrene resin other than the styrene polymer recited in (A); and C) a particulate or granular additive.

2. The composition of claim 1 wherein the styrene polymer (A) is obtained by reacting a living styrene polymer with at least one compound selected from a compound having in a molecule a linkage represented by formula (II)

wherein M denotes an oxygen or sulfur atom, an N-substituted aminoketone, an N-substituted aminothioketone, an N-substituted aminoaldehyde and an N-substituted aminothioaldehyde, and then conducting hydrolysis.

3. The composition of claim 2 wherein the compound having the linkage of formula (II) is at least one compound selected from the group consisting of an N-substitute lactam, an N-substituted thiolactam, an N-substituted cyclic urea and an N-substituted cyclic thiourea.

* * * * *